US006285168B1

(12) United States Patent
Davis

(10) Patent No.: US 6,285,168 B1
(45) Date of Patent: *Sep. 4, 2001

(54) REACTIVE DROOP COMPENSATION SYSTEM AND METHOD

(75) Inventor: Gerald W. Davis, New Berlin, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/410,252

(22) Filed: Sep. 30, 1999

(51) Int. Cl.$^7$ ....................................... H02P 9/00
(52) U.S. Cl. .............................. 322/20; 322/58
(58) Field of Search ................... 322/17, 18, 19, 322/20, 21, 22, 29, 58

(56) References Cited

U.S. PATENT DOCUMENTS

| | | | |
|---|---|---|---|
| 3,702,965 | * 11/1972 | Drexler et al. | 322/25 |
| 3,758,843 | 9/1973 | Ishizaki et al. | 322/25 |
| 4,232,253 | 11/1980 | Mortelmans | 315/370 |
| 4,245,182 | 1/1981 | Aotsu et al. | 322/20 |
| 4,482,868 | 11/1984 | Whatley | 330/274 |
| 4,908,565 | * 3/1990 | Cook et al. | 322/10 |
| 5,302,906 | * 4/1994 | Lerch | 324/650 |
| 5,336,932 | * 8/1994 | Barske | 290/1 R |
| 5,483,147 | * 1/1996 | Ilic et al. | 322/25 |
| 5,515,001 | 5/1996 | Vranish | 330/69 |
| 5,559,421 | * 9/1996 | Miyakawa | 322/58 |
| 6,066,897 | * 5/2000 | Nakamura | 290/4 A |
| 6,072,303 | * 6/2000 | Nicholadze et al. | 322/20 |
| 6,218,813 | * 11/2000 | Davis | 322/20 |

* cited by examiner

Primary Examiner—Nicholas Ponomarenko
(74) Attorney, Agent, or Firm—Himanshu S. Amin; Alexander M. Gerasimow; William R. Walbrun

(57) ABSTRACT

A system for controlling reactive currents in a generator is provided. A control system receives current and voltage feedback from the generator. The control system determines a phase angle based on the current and voltage feedback. The control system determines a compensation signal corresponding to the phase angle and current. The control system modifies a generator excitation signal based on the compensation signal and a bi-linear transformation technique.

17 Claims, 6 Drawing Sheets

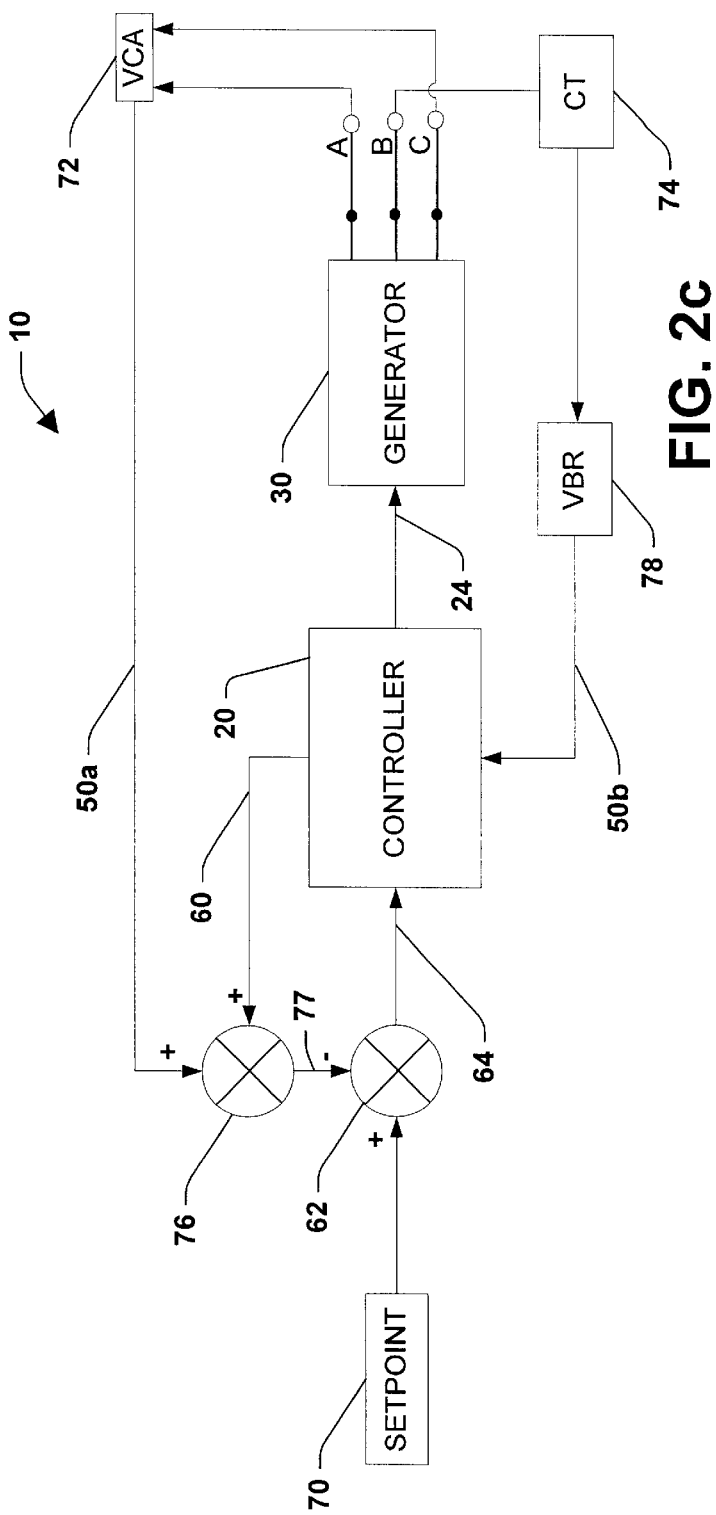
FIG. 2c
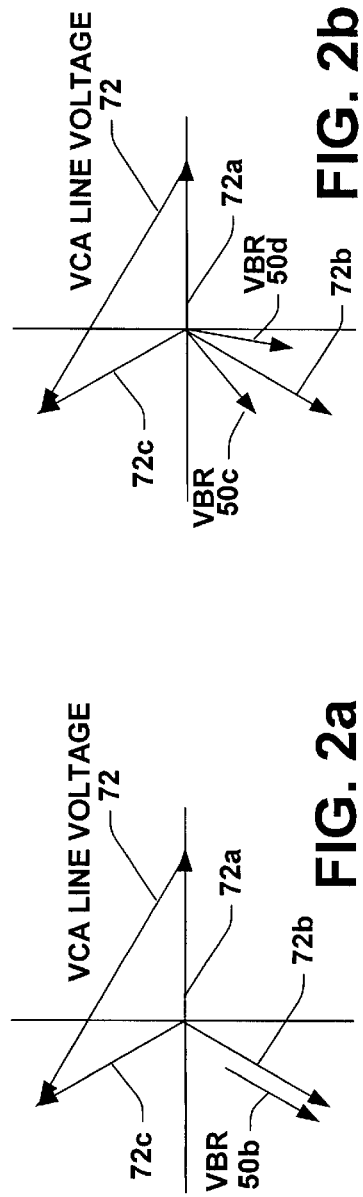
FIG. 2b
FIG. 2a

REACTIVE DROOP COMPENSATION SYSTEM AND METHOD

FIELD OF THE INVENTION

The present invention generally relates to a system and method for controlling reactive circulating currents in voltage generators. In particular, the present invention employs a bi-linear transformation technique to facilitate controlling reactive circulating currents.

BACKGROUND OF THE INVENTION

Power generation is a fundamental aspect of the modern technological age. The need for efficient power at affordable prices is found in many areas such as, for example, industrial, commercial, and consumer applications. Power needs are ever increasing as computer users demand more power. As the need for power increases, so does the need for uninterrupted power. Many industrial applications require twenty four hour a day operation, therefore, loss of power can have severe economic consequences. Many commercial applications, such as banking, require round the clock service to customers, and computer power must be maintained to provide such services. Even home consumers have increased needs for continuous power as a result of the home computer revolution.

One way power suppliers provide uninterrupted power is to employ parallel voltage generating systems. By paralleling generators, power can be delivered reliably because one generator can provide power for another when it fails. Technical problems must be overcome, however, because parallel generators may produce large reactive circulating currents flowing between the generators. Reactive circulating currents are therefore undesirable. Reactive currents increase generator power losses and reduce generator efficiency.

Analog systems have historically been employed to control reactive circulating currents. Although analog systems were able to accomplish the task, such systems were subject to drift and frequently required readjustment thereby increasing maintenance expenses and reducing reliability. As a consequence, digital systems have evolved to improve deficiencies of analog systems.

Digital control systems have mitigated the need to manually adjust control systems. Digital systems operate by computing control signals in response to generator feedback. Traditional analog systems rely on analog systems such as amplifiers, capacitors, diodes, and resistors to control necessary parameters to reduce reactive circulating currents. Digital systems, however, rely on control systems to compute the necessary parameters for controlling reactive circulating currents. Several of the determined parameters require complex algebra and trigonometry in conventional control systems. Therefore, fairly rigorous mathematical steps are necessary to determine the parameters. Rigorous mathematical computations produce inefficiencies in control systems by increasing the processing requirements of the controllers. Such inefficiencies contribute to increased power losses in the generators and may ultimately lead to increased costs to consumers.

Consequently, there is a strong need in the art for a system and/or method for controlling reactive circulating currents in voltage generators which mitigate some of the aforementioned problems associated with conventional systems and/or methods.

SUMMARY OF THE INVENTION

The present invention provides a system and method for controlling reactive circulating currents in voltage generators by applying a bi-linear transformation to a complex mathematical surface composed of key variables fed back from a generator. It has been found that control system performance may be improved significantly by reducing complex mathematical processing to a small series of efficient and reliable tasks.

More particularly, it has been found that a geometric analysis of key feedback variables from the voltage generator significantly reduce the trigonometric computations required of the control system. Key feedback variables include the generator voltage, current, and power factor phase angle with respect to the generator voltage and current. By controlling the phase angle, reactive circulating currents may be minimized.

By analyzing the power factor phase angle with respect to current feedback, a three dimensional mathematical surface may be constructed describing a control compensation signal with respect to the power factor phase angle and current. The control compensation signal is produced by a controller to facilitate minimizing reactive circulating currents. By applying a geometric analysis to the three dimensional surface, a two dimensional bi-linear equation is produced which greatly reduces the computations necessary to produce the control compensation signal.

In accordance with one aspect of the present invention, a system for controlling reactive currents in a generator is provided. A control system receives current and voltage feedback from the generator. The control system determines a phase angle based on the current and voltage feedback. The control system determines a compensation signal corresponding to the phase angle and current magnitude. The control system modifying a generator excitation signal based on the compensation signal and a bi-linear transformation technique.

Another aspect of the present invention provides for a system for controlling reactive currents in a generator; including: means for receiving current and voltage feedback from the generator; means for determining a phase angle based on the current and voltage feedback; means for determining a compensation signal corresponding to the phase angle and current magnitude; and means for modifying a generator excitation signal based on the compensation signal and a bi-linear transformation technique.

Yet another aspect of the present invention provides for a method for controlling reactive currents in a generator. Current and voltage feedback are received from the generator. A phase angle based on the current and voltage feedback is determined. A compensation signal corresponding to the phase angle and current magnitude is determined. A generator excitation signal is modified based on the compensation signal and a bi-linear transformation technique.

Another aspect of the present invention provides for a system for controlling reactive currents in a generator, including: a system for receiving current and voltage feedback from the generator; a system for determining a phase angle based on the current and voltage feedback; a system for determining a compensation signal corresponding to the phase angle and current magnitude; a system for modifying a generator excitation signal based on the compensation signal and a bi-linear transformation technique, the bi-linear technique employing at least the following equations:

$$Z_P = -[C \times X_P \times \theta_P];$$

wherein:

$Z_P$ provides the compensation signal which represents (voltage droop magnitude in per units—VCA magnitude in per units);

C is a constant defined by known endpoints of a plane representive of a three-dimensional relationship between a rated, per unit, burden voltage; a power factor phase angle; and voltage droop over the rated, per unit, range;

$X_P$ is a most recent burden voltage factor (VBR); and $\theta_P$ is a most recent power factor phase angle computed from the voltage and current feedback.

The system further employs the equation:

$$C=(Z_{P1}-Z_{P2})/[(\theta_{P1}-\theta_{P2})\times(X_{P5}-X_{P6})];$$

wherein: $Z_{P1}$ and $Z_{P2}$ are endpoints of a VDROOP axis within the predetermined range of the plane; $\theta_{P1}$ and $\theta_{P2}$ are endpoints of a power factor phase angle axis within the predetermined range of the plane; and $X_{P5}$ and $X_{P6}$ are endpoints of a VBR axis within the rated, per unit, range of the plane.

To the accomplishment of the foregoing and related ends, the invention, then, comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 2a and 2b phasor diagrams for a control system for controlling reactive circulating currents in accordance with the present invention;

FIG. 2c is a schematic block diagram of a control system for controlling reactive circulating currents in accordance with the present invention;

DETAILED DESCRIPTION OF THE INVENTION

Figure 1:
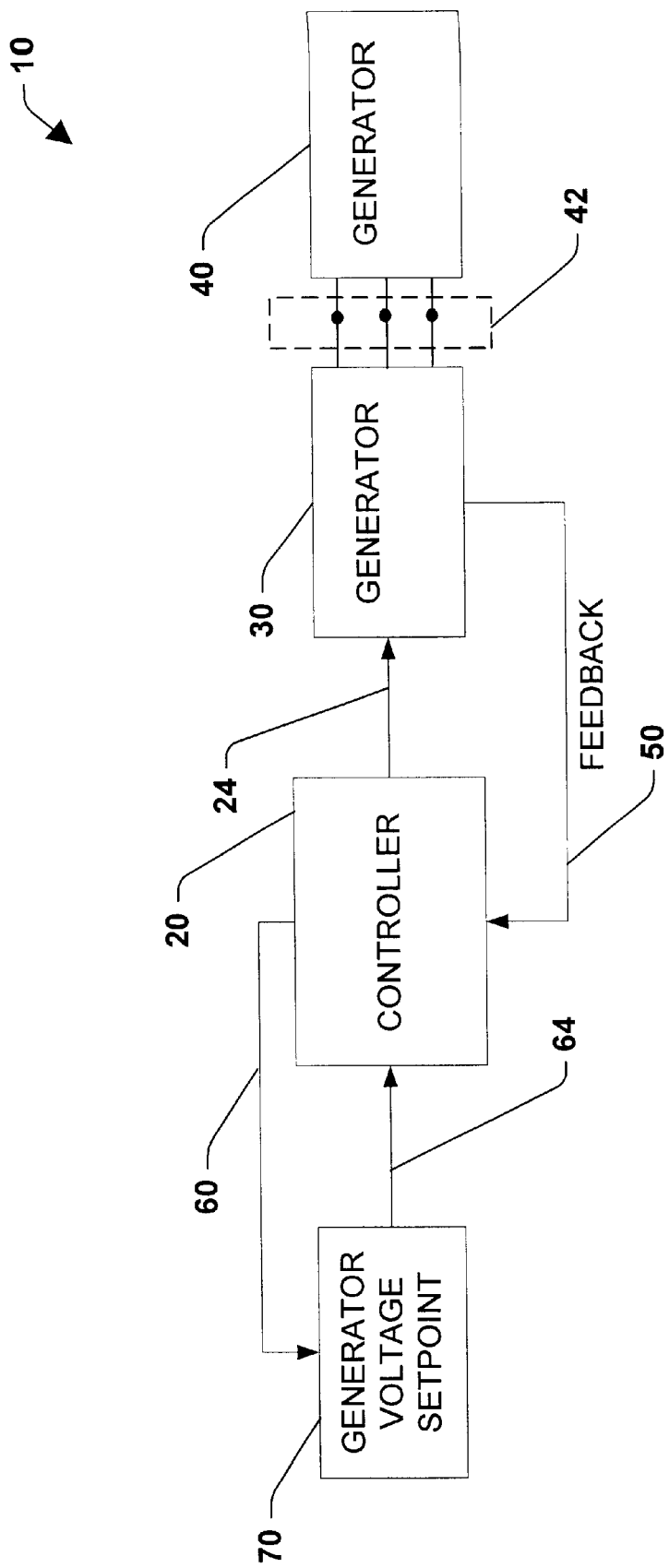
FIG. 1 is a schematic block diagram of a control system for controlling reactive circulating currents in accordance with the present invention.

The present invention will now be described with reference to the drawings, wherein like reference numerals are used to refer to like elements throughout.

Referring initially to FIG. 1, a schematic block diagram of a control system 10 for controlling reactive circulating currents in accordance with the present invention is shown. The control system 10 employs a controller 20 to monitor and control reactive circulating currents in a generator 30. The controller 20 provides a generator excitation voltage 24 to control the voltage output and the reactive circulating current in the generator 30. Reactive currents may flow into or out of the generator 30 when coupled to a generator 40 at output voltage connection point 42. The generators 30 and 40 are said to be paralleled when connecting the respective output voltages together at connection point 42. The generators 30 and 40, may be paralleled to provide back-up voltage capability to power consumers if one of the generators were to fail. Reactive circulating currents which flow as a result of parallel generator operation, cause increased power losses and therefore should be minimized.

Reactive circulating currents are mitigated by the present invention by controlling a reactive phase angle between the voltage and current output from the generator 30. The cosine of the reactive phase angle is known as the power factor. A reactive phase angle greater than zero degrees is said to be a leading power factor whereas a reactive phase angle less than zero degrees is said to be a lagging power factor. A phase angle equal to zero degrees is said to be unity power factor. Reactive circulating currents are minimum when the power factor is unity. Thus, the desired state of operation for the control system 10 is to tend toward unity power factor thereby minimizing reactive circulating current.

The controller 20 receives a feedback 50 voltage and current from the generator 30 and determines a reactive phase angle respective to the voltage and current. The reactive phase angle indicates the amount of reactive circulating current flowing into or out of the generator 30. The feedback 50 provides input to the controller 20 to determine if a reactive phase angle exists indicating a lagging or leading power factor. Upon determination of the reactive phase angle, the controller 20 determines a compensation signal 60. The compensation signal 60 is employed to reduce a lagging or leading power factor thereby causing the state of control system 10 to tend toward unity power factor.

The controller 20 employs a processor (not shown) for controlling the real-time operation of the control system 10. During real-time operation, the controller 20 continuously monitors feedback 50, determines the reactive phase angle, and generates the compensation signal 60 to reduce the reactive current. As described in more detail below, many controller processing operations may be required to determine the compensation signal 60. Therefore, the controller 20 employs a bi-linear transformation technique, not provided in conventional control systems, to determine the compensation signal 60 for controlling reactive circulating currents.

The bi-linear transformation technique, which will be described in greater detail below, greatly reduces the number and complexity of controller operations. The number and complexity of operations are reduced by transforming complex algebraic and trigonometric calculations into a bi-linear equation thereby simplifying the processing burden of the controller 20. Thus, higher speed control performance is achieved over conventional systems. A significant advantage of higher speed performance is that the real-time operating system of the controller 20 may control reactive circulating currents more precisely than conventional systems. In particular, higher precision control of reactive circulating currents is achieved because the controller 20 has more time to determine the compensation signal 60 than conventional systems. Also, because of higher speed operations, the controller 20 has increased time to monitor feedback 50 and minimize reactive currents by updating the compensation signal 60 more often than conventional systems. By controlling reactive circulating currents more precisely, reactive currents are minimized thereby decreasing power losses and increasing the efficiency of the generator 30. Thus, increased generator efficiency provides lower costs to power consumers because less power is lost due to reactive circulating currents. Another advantage the bi-linear transformation technique provides, is lower cost controllers may be employed to control reactive currents since the number and complexity of the controller 20 operations are diminished.

The controller 20 controls reactive circulating currents in the generator 30 via the generator excitation voltage 24. The generator excitation voltage 24 is determined from a control input 64. The control input 64 is determined as the difference between a generator voltage set point 70 and the compensation signal 60. The generator voltage set point 70 is the desired voltage output of the generator determined by a user. To minimize reactive currents, the controller 20 continuously monitors feedback 50 and updates the compensation signal 60. If any leading or lagging power factor is determined, the controller 20 increases or decreases the compensation signal 60 causing control input 64 to change. As the control input 64 changes, the generator excitation 24 changes, and the reactive phase angle may be controlled. As will be described in more detail below, the control input 64 is provided to the controller 20 from a summation point that combines the generator voltage set point 70 and the compensation signal 60.

Referring now to FIG. 2a, a phasor diagram of the various system voltages employed by a system 10 of FIG. 2c is shown. The generator 30 terminal output voltage phasors VA 72a, VB 72b, and VC 72c are shown in a phasor diagram. The line voltage, VCA 72 is shown as the vector summation of VA 72a and VC 72c. As will be described in more detail below, a voltage phasor VBR 50b is produced by the system 10 in FIG. 2c that represents a current phasor indicative of the reactive phase angle between VB 72b and the phase current supplied by VB 72b. As reactive currents change, the reactive phase angle changes causing a lagging or leading power factor. In FIG. 2a, VBR 50b is shown in phase with VB 72b indicating a unity power factor. In FIG. 2b, a VBR 50c phasor represents a lagging power factor, and a VBR 50d phasor represents a leading power factor.

Now referring to FIG. 2c, a more detailed schematic block diagram of control system 10 illustrates how the controller 20 employs voltage and current feedback 50a and 50b to determine the compensation signal 60 for controlling reactive currents. The generator 30 produces a three phase output voltage at terminals A, B, and C. A voltage VCA 72, which represents the line voltage from terminal C and terminal A, is fed back and summed with the compensation signal 60 at a summing junction 76. The output 77 of the summing junction 76 is subtracted from the set point 70 at summing junction 62 to provide the control input 64.

Coupled to terminal B of generator 30 is a current transforming system 74. The current transforming system 74 in the preferred embodiment is a step down current transformer. It is to be appreciated that other suitable systems and/or methods for providing current feedback may be employed to carry out the present invention. The current transforming system 74 provides transformed phase current from terminal B of generator 30 to a VBR 78 system. The VBR 78 system converts the phase current from the current transforming system 74 to a burden voltage VBR 50b. In the preferred embodiment, a burden resistor (not shown) of about 1Ω is employed by the VBR system 78 to provide the burden voltage VBR 50b. It is to be appreciated that other resistance values and/or voltage conversion techniques may be employed by the VBR 78 system. The burden voltage VBR 50b is indicative of the phase angle of current with respect to the voltage from terminal B of generator 30, shown as Vb 72b in FIG. 2a. The controller 20 determines a reactive phase angle relationship between the burden voltage 50b and Vb 72b to determine the reactive phase angle of the generator 30 output voltage and current.

As will be discussed in greater detail below, an approximate 90 degree right angle phase relationship between VBR 50b and VCA 72 indicates unity power factor causing the controller 20 to maintain the generator excitation voltage 24 at the present level. If phase relationships other than 90 degrees are detected between VBR 50b and VCA 72, the controller 20 will determine a compensation signal 60 that increases or decreases the generator excitation voltage 24. By increasing or decreasing the generator excitation voltage 24, reactive circulating currents may be minimized by reducing the reactive phase angle between VBR 50b and VCA 72.

Figure 3A:
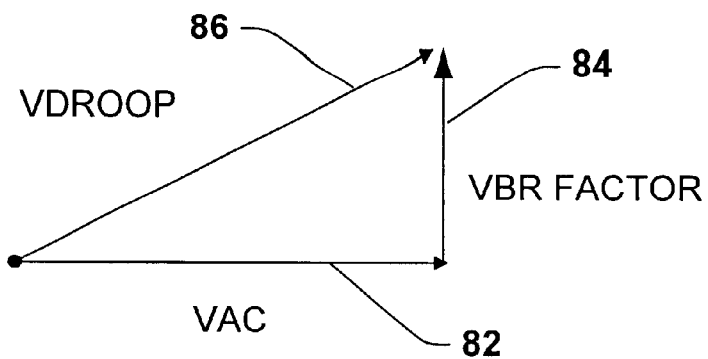
FIGS. 3a, 3b, and 3c are phasor diagrams of a control signal with respect to voltage and current feedback in accordance with the present invention.
Figure 3B:
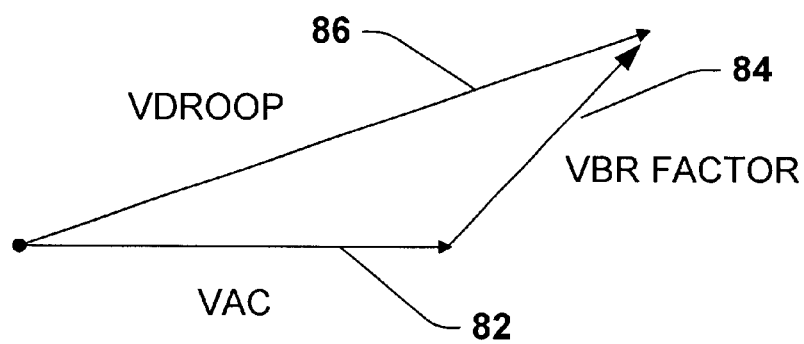
Figure 3C:
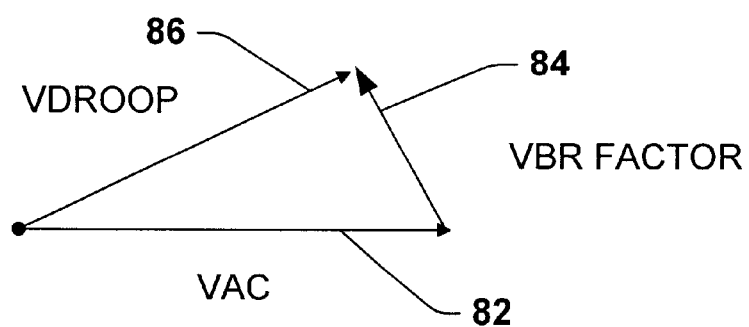

Now referring to FIGS. 3a through 3c in conjunction with FIG. 2c, detailed functions of the controller 20 are described. FIG. 3a illustrates a 90 degree relationship between a phasor VCA 82 and a phasor VBR factor 84. The VCA 82 phasor is the same as VCA 72 in FIG. 2c but rotated 120 degrees and as described below, expressed in "per unit" units. The phasors VCA and VBR factor form a phasor triangle with a resultant VDROOP 86 hypotenuse. As will be described below, VDROOP 86 is employed to produce the controller 20 compensation signal 60.

The VBR factor 84 is a product of VBR 50b from FIG. 2c, a scale factor (not shown) and droop percentage (not shown). The scale factor (SF), as will be illustrated below, is employed to computationally adjust the factors of VBR 84 and VCA 82 into a "per unit" simplifying conversion. For example, the scale factor allows for the determination of VDROOP 86 at the rated VCA 82 and VBR 84 without computing voltages and currents having values other than 1. The droop percentage defines the maximum amount of VDROOP 86 at the rated VBR 84 and rated VCA 82. In the preferred embodiment, the droop percentage is about 10%. Therefore, at rated voltage and current, VBR=1 or 100%, VCA=1 or 100%, and droop percentage=0.1 or 10%.

FIG. 3b illustrates a phasor relationship between the VBR factor 84 and VCA 82 of greater than 90 degrees or a lagging power factor. As shown in FIG. 3b, the VDROOP 86 phasor is greater in magnitude because of the lagging power factor. As will be described below, a greater magnitude VDROOP 86 phasor produces a greater magnitude compensation signal 60. Referring briefly to FIG. 2c, a greater magnitude compensation signal 60 combined with VCA 50a at summing junction 76, is applied as negative feedback to the set point 70. This in turn produces a smaller input voltage to the controller 30 thereby reducing the generator excitation 24.

FIG. 3c illustrates a phasor relationship between the VBR factor 84 and VCA 82 of less than 90 degrees or a leading power factor. As shown in FIG. 3c, the VDROOP 86 phasor is smaller in magnitude because of the leading power factor. As will be described below, a smaller magnitude VDROOP 86 phasor produces a smaller magnitude compensation signal 60. Referring briefly to FIG. 2c, a smaller magnitude compensation signal 60 combined with VCA 50a at summing junction 76, is applied as negative feedback to the set point 70. This in turn produces a larger input voltage to the controller 30 thereby increasing the generator excitation 24.

Determination of the VDROOP signal 86 may be determined by applying trigonometric and algebraic computations. Referring to FIG. 3b for example, and applying the law of cosines, VDROOP 86 maybe determined in Equation 1 as follows:

$$(VDROOP)^2 = VCA^2 + (VBR \times DP \times SF)^2 - 2[(VCA \times DP \times SF)]\cos(90°+\theta) \quad \text{Equation 1:}$$

It is noted that $\theta$ is the angle between the VBR 50c or 50d and V$b$ 72b in FIG. 2c. Under maximum lagging compensation conditions, VDROOP is defined as 110% or 1.1, and $\theta$ is defined as $-\cos^{-1}(0.8) = -36.869°$. By employing a per unit rating of VBR=VCA=1, and applying droop percentage as 10%, Equation 1 simplifies to Equation 2 as follows:

$$(1.1)^2 = 1 + (1 \times 0.1 \times SF)^2 - 2[(1 \times 0.1 \times SF)]\cos(90°+\theta) \quad \text{Equation 2:}$$

By applying the quadratic equation to Equation 2, and solving for the scale factor SF, the following solution is shown in Equation 3 as follows:

$$SF = 1.54983 \quad \text{Equation 3:}$$

It is noted that different factors, percentages, and angles may be employed to produce different scale factors for different applications.

After determining the scale factor, the controller 20 may compute the value of VDROOP as shown in Equation 1 above. Trigonometric computations shown in Equation 1 may require excessive controller processing bandwidth. Therefore, a bi-linear transformation technique, as described below will be employed to greatly simplify the VDROOP computation and improve the controller 20 performance.

Figure 4:
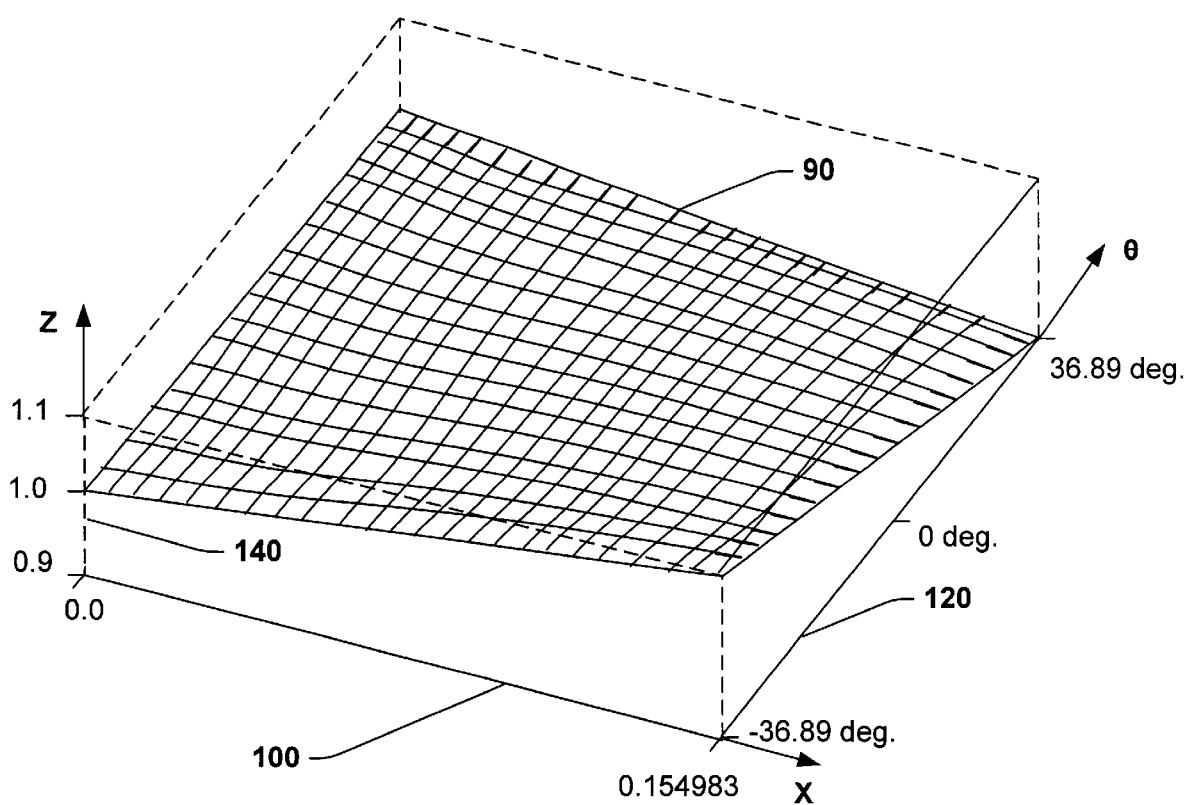
FIG. 4 is a three dimensional surface diagram illustrating a geometric relationship between feedback variables and the controller compensation phasor magnitude in accordance with the present invention.

Referring to FIG. 4, a surface 90 illustrates a three dimensional relationship between a VBR factor 100 axis, plotted on the X axis, versus a power factor angle 120 axis, plotted on the $\theta$ axis in degrees, versus a VDROOP 140, plotted on the Z axis in "per unit" units is shown. The VBR factor 100 axis ranges from 0 to 0.154983. As explained above, the VBR factor 100 is (VBR·Scale Factor·droop percentage). The power factor angle 120 axis ranges from $-\theta$max to $+\theta$max. The power factor angles 120 range from a power factor of 0.8 leading correlating to an angle 36.87 degrees, to a power factor of 0.8 lagging or an angle of $-36.87$ degrees. As shown on the Z-axis, the VDROOP 140 axis ranges from 1.1 or 110%, to 0.9 or 90%. It is to be appreciated that other percentage ranges for VDROOP may be chosen. The preferred embodiment employs a maximum droop percentage of about 10%.

As surface 90 illustrates, a fairly linear or planar surface results when plotting the VDROOP 140, VBR factors 100, and power factor angles 120. By applying geometric analysis to the surface 90, a bi-linear equation may be derived to provide a high speed and efficient technique for computing VDROOP.

Figure 5A:
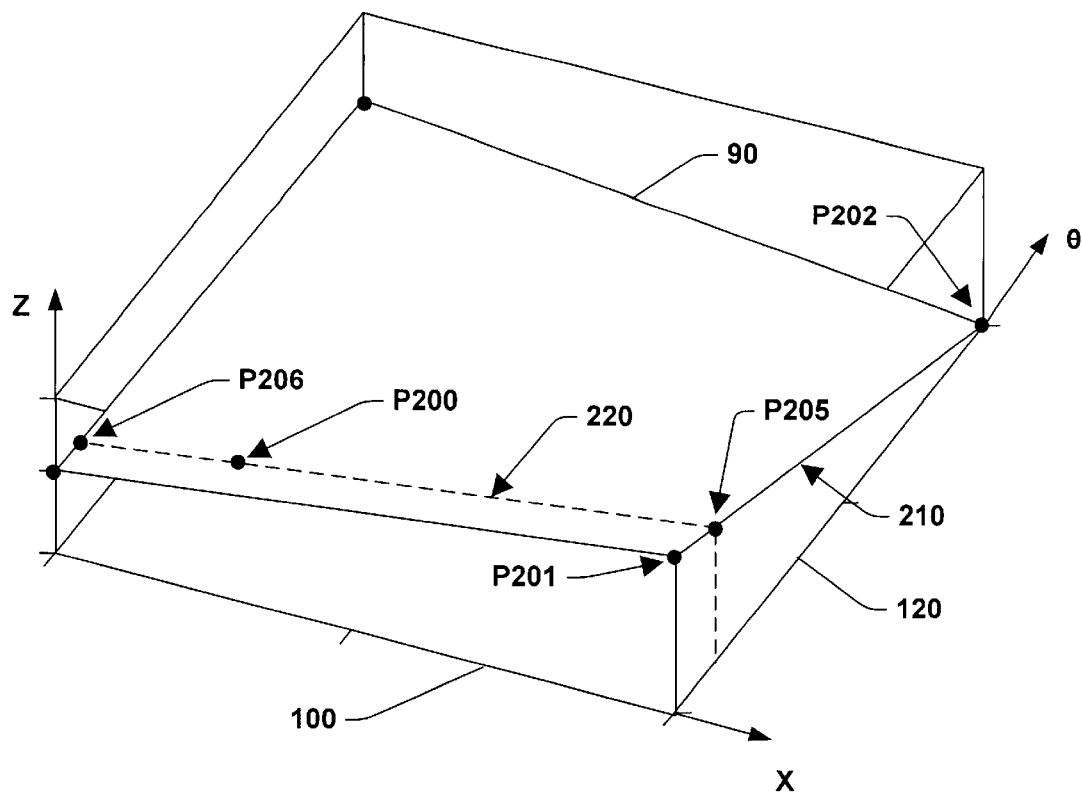
FIGS. 5a, 5b, and 5c are diagrams illustrating a bi-linear transformation of the three dimensional surface in FIG. 4 in accordance with the present invention.

Now referring to FIG. 5a, a point P200, is shown which represents a desired VDROOP 140. It is desired to compute P200 specifically without employing trigonometric computations during real-time operations of the controller 20.

Figures 5B, 5C:
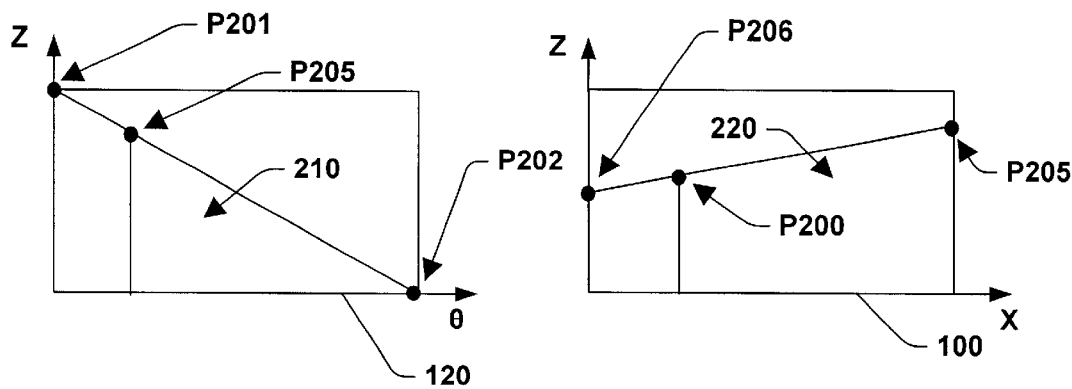

Referring to FIG. 5b, a Z and $\theta$ plane 210 is shown containing points P201, P205, and P202. Note how the Z and $\theta$ plane 210 is perpendicular to the X axis shown in FIG. 5a. As shown in FIGS. 5a and 5b, P205 which is part of plane 210, also is part of an intersecting Z and X plane 220 shown in FIG. 5c. From FIGS. 5b and 5c, a set of equations may be developed to determine the VDROOP at P200.

The general equation for a line shown in Equation 4 yields:

$$(y-y_2)/(x-x_2) = (y_1-y_2)/(x_1-x_2) \quad \text{Equation 4:}$$

From which the Z value for P$_{205}$ is given from the coordinates of P201, P202, and $\theta$ axis value of P205:

$$Z_{P205} = [(Z_{P201}-Z_{P202}/\theta_{P201}-\theta_{P202}) \times (\theta_{P200}-\theta_{P202})] + Z_{P202} \quad \text{Equation 5:}$$

where P201, P202, and P205 are defined in three Equations 6, 7, and 8 and FIG. 5a:

$$P201 = (X_{P201}, \theta_{P201}, Z_{P201}) = (0.154983, -36.87°, 1.1) \quad \text{Equation 6:}$$

$$P202 = (X_{P202}, \theta_{P202}, Z_{P202}) = (0.154983, +36.87°, 0.9) \quad \text{Equation 7:}$$

$$P205 = (X_{P205}, \theta_{P205}, Z_{P205}) = (0.154983, \theta_{P200}, Z_{P205}) \quad \text{Equation 8:}$$

From Equation 8, it can be seen that $\theta_{P205}$ and $\theta_{P200}$ have the same $\theta$ value. Now observing FIG. 5c, P206 may be calculated as P205 in FIG. 5b.

$$P206 = (X_{P206}, \theta_{P206}, Z_{P206}) = (0, \theta_{P200}, 1.0) \quad \text{Equation 9:}$$

Note that P205, P206, and P200 all have the same $\theta$ value. The Z value for P206 is 1.0 corresponding to a VBR factor 140 of 0.0. The Z value for P200 is given by:

$$Z_{P200} = [(Z_{P205}-Z_{P206}/X_{P205}-X_{P206}) \times (X_{P200}-X_{P206})] + X_{P206} \quad \text{Equation 10:}$$

By combining Equations 5 and 10, the following equation is derived:

$$Z_{P200} = 1 - [C \times X_{P200} \times \theta_{P200}] \quad \text{Equation 11:}$$

where C is a constant defined by the known endpoints of the plane 210 in FIG. 5b and the plane 220 in FIG. 5c. $X_{P200}$ is the most recent VBR factor produced from the current feedback 50b to the controller 20 shown in FIG. 2d. $\theta_{P200}$ is the most recent power factor angle computed from the V$b$ 72b and VBR 50b. The compensation signal 60 is provided from VDROOP 140 and represents Zp. It follows then that $Z_P = Z_{P200} - 1$, (voltage droop magnitude in per units—VCA magnitude in per units).

$$C = (Z_{P201}-Z_{P202})/[(\theta_{P201}-\theta_{P202}) \times (X_{P205}-X_{P206})] \quad \text{Equation 12:}$$

Equation 12 and the Scale Factor may be computed a single time at initialization of the controller 20. Thereafter, during real-time operation of the controller, Equation 11 provides an extremely fast and efficient method for determining the next value of VDROOP.

Figure 6:
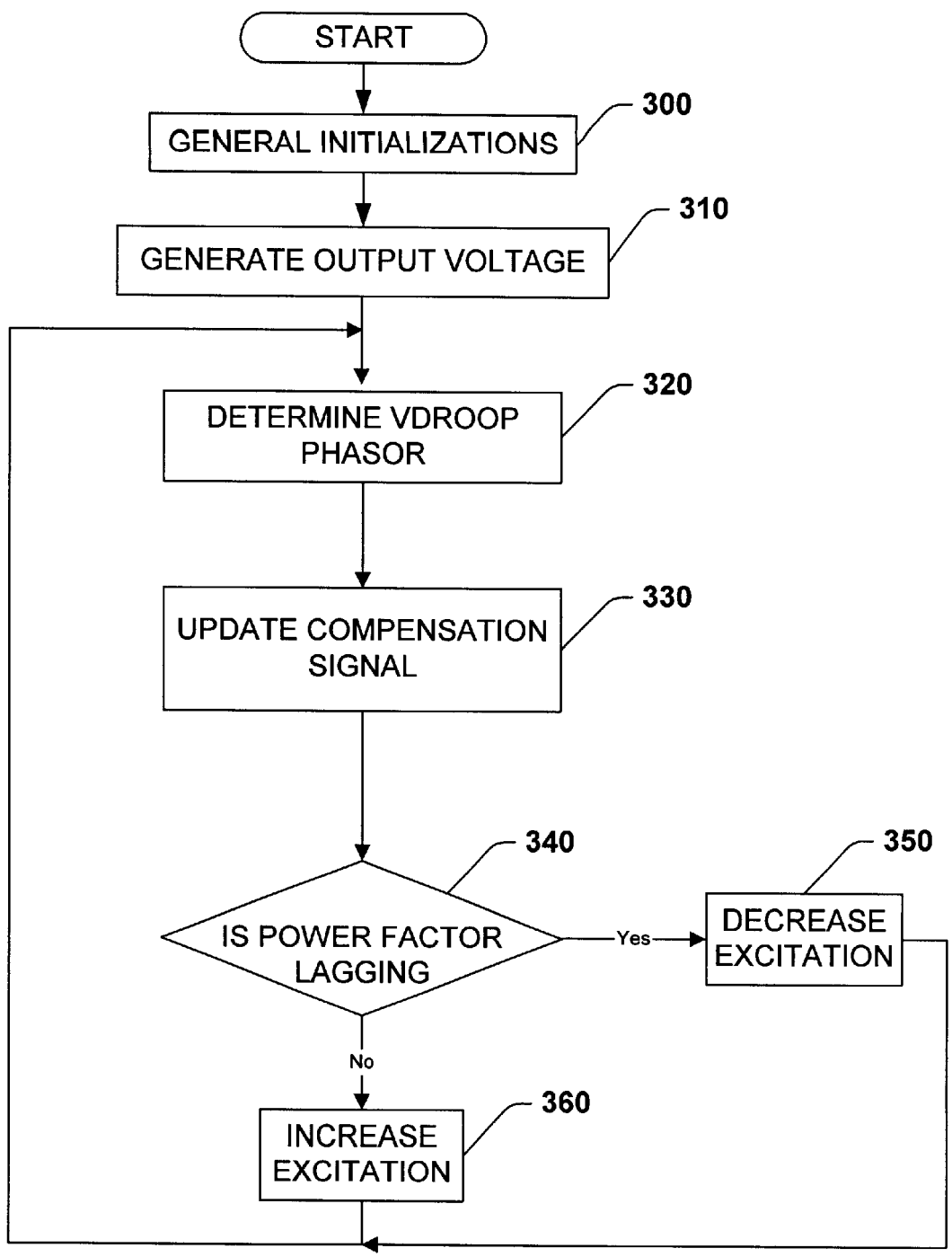
FIG. 6 is a flow diagram of a methodology for controlling reactive circulating current in accordance with the present invention.

Referring to FIG. 6, a method for controlling reactive currents is shown. The method refers to the control system 10 shown in FIG. 2c, and to equations 1 through 12 mentioned above. Starting at step 300, the method proceeds to initialize key variables and determine key parameters for the controller 20 operation. The method determines a scale factor as demonstrated in equations 1 through 3. Also during controller 20 initialization, the method determines a constant C as shown in equation 12 and proceeds to step 310.

At step 310, the method outputs a generator excitation voltage 24 and proceeds to step 320. At step 320, the method determines the VDROOP phaser angle and magnitude as described in equation 11 above and proceeds to step 330. At step 330, the compensation signal 60, defined as Zp, is determined and the method updates the compensation signal 60 with the latest value of Zp. The method then proceeds to step 340.

At step 340, the method determines if the power factor is lagging. If the power factor is lagging, the method proceeds to step 360 and decreases generator excitation. If the power factor is not lagging at step 340, the method proceeds to step 370 and increases generator excitation. From either step 360 or 370, the method proceeds back to step 330 to determine another VDROOP phasor.

It should be understood that the math terminology describing bi-linear equations as used herein would relate to all forms of such equations including bi-linear polynomials and the like. For example, a preferred embodiment of the present invention which provides adequate accuracy has previously described the use of a bi-linear first order term in the form of $Z=C \times q \times X$ within the transformation technique. However, the use of a bi-linear polynomial in the general form of $Z=a(x \times y)+b(x \times y)^2+c(x \times y)^3$ ¼ could be utilized to provide greater accuracy. Further, in an alternative embodiment, the law of cosines as previously described could be utilized in a control system without simplifying the computations with the transformation technique.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for controlling reactive currents in a generator; comprising:
  a control system for receiving current and voltage feedback from the generator, the control system determining a phase angle based on the current and voltage feedback, the control system determining a compensation signal corresponding to the phase angle and current, the control system modifying a generator excitation signal based on the compensation signal and a bi-linear transformation technique.

2. The system of claim 1, further including a resistive element for converting the current feedback to a voltage.

3. The system of claim 2, further including a current transforming system to facilitate providing phase current to the resistive element.

4. The system of claim 1, the control system further including a first summing system to combine the compensation signal with a line voltage of the generator to provide a first output.

5. The system of claim 1, further including a second summing system to combine the first output with a voltage set point, the voltage set point setting a voltage level of the generator, to provide a control input to a controller.

6. The system of claim 5, the controller employing the control input in determining a desired level of excitation voltage to be applied to the generator.

7. The system of claim 1 the bi-linear technique employing at least the following equations:

$$Z_P = -[C \times X_P \times \theta_P];$$

wherein:
  $Z_P$ provides the compensation signal which represents (voltage droop magnitude in per units—VCA magnitude in per units);
  C is a constant defined by known endpoints of a plane representive of a three-dimensional relationship between a burden voltage; a power factor phase angle; and voltage droop over a predetermined range;
  $X_P$ is a most recent burden voltage factor (VBR); and
  $\theta_P$ is a most recent power factor phase angle computed from the voltage and current feedback.

8. The system of claim 7 further employing the equation:

$$C = (Z_{P1} - Z_{P2}) / [(\theta_{P1} - \theta_{P2}) \times (X_{P5} - X_{P6})];$$

wherein:
  $Z_{P1}$ and $Z_{P2}$ are endpoints of a VDROOP axis within the predetermined range of the plane;
  $\theta_{P1}$ and $\theta_{P2}$ are endpoints of a power factor phase angle axis within the predetermined range of the plane; and
  $X_{P5}$ and $X_{P6}$ are endpoints of a VBR axis within the rated, per unit, range of the plane.

9. A system for controlling reactive currents in a generator; comprising:
  means for receiving current and voltage feedback from the generator;
  means for determining a phase angle based on the current and voltage feedback;
  means for determining a compensation signal corresponding to the phase angle and current; and
  means for modifying a generator excitation signal based on the compensation signal and a bi-linear transformation technique.

10. A method for controlling reactive currents in a generator; comprising:
  receiving current and voltage feedback from the generator;
  determining a phase angle based on the current and voltage feedback;
  determining a compensation signal corresponding to the phase angle and current; and
  modifying a generator excitation signal based on the compensation signal and a bi-linear transformation technique.

11. A system for controlling reactive currents in a generator; comprising:
  a system for receiving current and voltage feedback from the generator;
  a system for determining a phase angle based on the current and voltage feedback;
  a system for determining a compensation signal corresponding to the phase angle and current;
  a system for modifying a generator excitation signal based on the compensation signal and a bi-linear transformation technique, the bi-linear technique employing at least the following equations:

$$Z_P = -[C \times X_P \times \theta_P];$$

wherein:
  $Z_P$ provides the compensation signal which represents (voltage droop magnitude in per units—VCA magnitude in per units);
  C is a constant defined by known endpoints of a plane representive of a three-dimensional relationship between a burden voltage; a power factor phase angle; and voltage droop over a predetermined range;
  $X_P$ is a most recent burden voltage factor (VBR); and
  $\theta_P$ is a most recent power factor phase angle computed from the voltage and current feedback.

12. The system of claim 11 further employing the equation:

$$C = (Z_{P1} - Z_{P2}) / [(\theta_{P1} - \theta_{P2}) \times (X_{P5} - X_{P6})];$$

wherein:
  $Z_{P1}$ and $Z_{P2}$ are endpoints of a VDROOP axis within the predetermined range of the plane;
  $\theta_{P1}$ and $\theta_{P2}$ are endpoints of a power factor phase angle axis within the predetermined range of the plane; and
  $X_{P5}$ and $X_{P6}$ are endpoints of a VBR axis within the rated, per unit, range of the plane.

13. The system of claim 11, further including a resistive element for converting the current feedback to a voltage.

14. The system of claim 12, further including a current transforming system to facilitate sampling providing phase current to the resistive element.

15. The system of claim 11, the control system further including a first summing system to combine the compensation signal with a line voltage of the generator to provide a first output.

16. The system of claim 11, further including a second summing system to combine the first output with a voltage set point, the voltage set point setting a voltage level of the generator, to provide a control input to a controller.

17. The system of claim 16, the controller employing the control input in determining a desired level of excitation voltage to be applied to the generator.

* * * * *